United States Patent [19]

Hille

[11] 3,959,873
[45] June 1, 1976

[54] METHOD OF MANUFACTURING A SOLID ELECTROLYTIC CAPACITOR

[75] Inventor: Peter M. Hille, Nurnberg-Katzwang, Germany

[73] Assignee: International Standard Electric Corporation, New York, N.Y.

[22] Filed: Aug. 20, 1974

[21] Appl. No.: 498,881

[30] Foreign Application Priority Data
Aug. 31, 1973 Germany............................ 2344073

[52] U.S. Cl.................................... 29/570; 317/230
[51] Int. Cl.²............................................ B01J 17/00
[58] Field of Search........................ 29/570; 317/230

[56] References Cited
UNITED STATES PATENTS

| | | | |
|---|---|---|---|
| 3,142,886 | 8/1964 | Bronson et al........................ | 29/570 |
| 3,307,086 | 2/1967 | Propps............................... | 29/570 X |

*Primary Examiner*—Roy Lake
*Assistant Examiner*—James W. Davie
*Attorney, Agent, or Firm*—John T. O'Halloran; Menotti J. Lombardi, Jr.

[57] ABSTRACT

A glass casing for a capacitor includes a lead wire at one closed end which is filled with aluminum powder. A hollow porous tubule is inserted into the powder which is sintered, with the glass mold withstanding the sintering. The mold and sintered body are immersed in an electrolyte with the lead wire connected as the anode to form the dielectric oxide layer. The oxide layer forming solution is removed and a manganizing solution penetrates through the tubule and sintered body. Another lead is inserted through the tubule and joined to the manganese layer. Resin may be poured into the open mold and the glass fused at the open end.

1 Claim, 1 Drawing Figure

U.S. Patent June 1, 1976 3,959,873
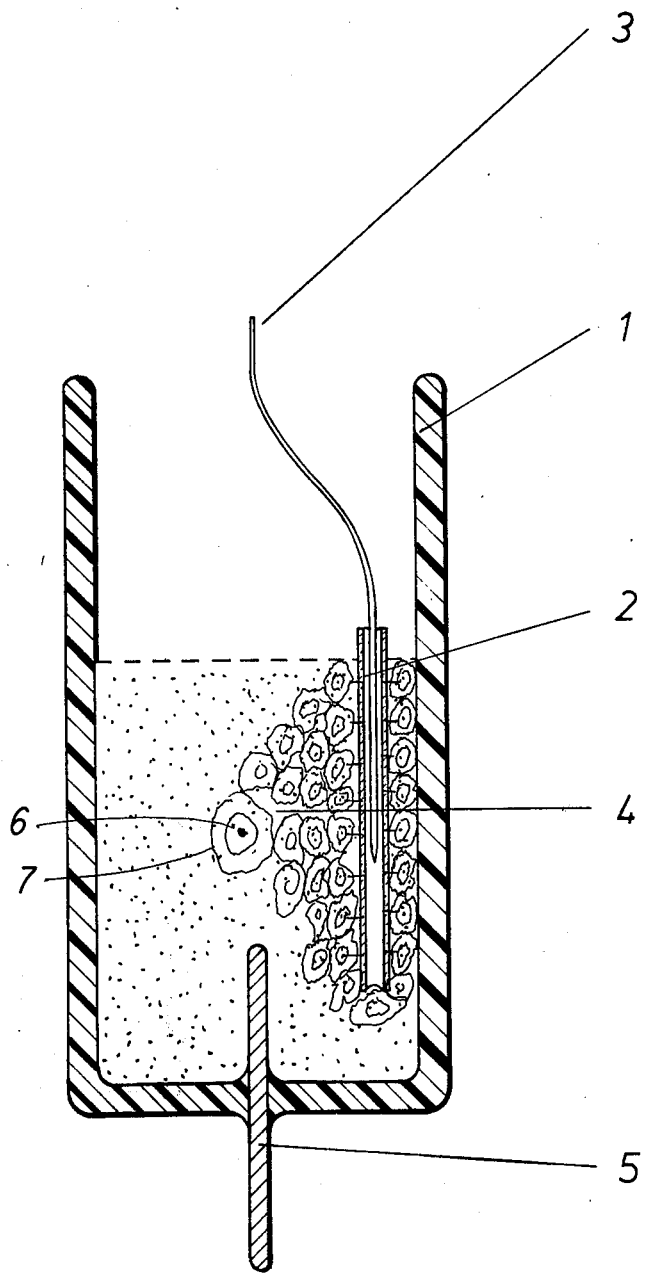

METHOD OF MANUFACTURING A SOLID ELECTROLYTIC CAPACITOR

BACKGROUND OF THE INVENTION

1. Field of the Invention

The present invention relates to an improved method of manufacturing a solid electrolytic capacitor using a glass casing.

2. Description of the Prior Art

In most of the known capacitor manufacturing methods, the valve-metal powder is pressed into a solid body. The pressed body is subsequently sintered in a vacuum furnace. This is followed by the forming and manganizing steps. In the case of tantalum or niobium capacitors, it is known to pour a proportioned quantity of powder into a mold so that a loose, incoherent powder mass is obtained which is sintered in the mold. The mold is usually of the same material as that to be sintered. It is also known, however, to use a different heat resistant material such as molybdenum or tungsten. After the manufacture is finished, the capacitors are usually plastic-encapsulated by dipping or injection molding.

SUMMARY OF THE INVENTION

It is therefore the object of the present invention to simplify the capacitor manufacturing method and provide an improved product utilizing a glass casing.

The use of a glass mold or casing has several significant advantages. The anode lead can be easily fused into the glass mold in a moisture-proof manner. At the same time, the lead is securely held in the powder mass poured into the mold so that the powder can be joined with this lead during the sintering process. Furthermore, at the end of the manufacturing process, the glass housing can be easily provided with a moisture-proof seal. As a rule, glass encapsulation of solid electrolytic capacitors is less expensive and more economical than plastic encapsulation.

The insertion of a ceramic tubule into the powder mass offers another advantage. This facilitates the forming and manganizing of the metal and allows the cathode lead to be securely anchored in the sintered body without the risk of a short circuit between this lead and the sintered body. The use of the ceramic tubule eliminates the need for the commonly used manufacturing steps in which the anode body was covered with a graphite layer, a silver layer, and a solder layer.

BRIEF DESCRIPTION OF THE DRAWING

The accompanying drawing shows the present novel capacitor at the initial stage of the process.

DESCRIPTION OF THE PREFERRED EMBODIMENT

As shown in the figure, a lead wire 5 is passed through the wall of the mold or casing 1, which is made of an insulating material such as glass, and fused together with the insulating material. One end of the lead wire 5 projects into the interior of the mold 1, into which aluminum powder 4 is poured in the next step. In addition, a hollow, porous tubule 2 of insulating material, such as of a sintered ceramic, is inserted into the aluminum powder. During the insertion of the tubule 2, care must be taken that the tubule 2 is not immediately adjacent to the lead wire 5, and that no aluminum powder gets into the tubule's interior.

After this preparation, the mold 1 of insulating material with the aluminum-powder filling 4 and the tubule 2 is placed into a sintering furnace and sintered. Because of this heating step, the mold must be made of an insulating material which withstands the sintering temperatures. Glass has proved suitable for these purposes. After the sintering process, which is carried out to about 600°C for one hour, the aluminum powder has been sufficiently sintered together and has joined the lead wire 5 fused into the wall of the mold.

The sintering process is followed by well-known forming and manganizing steps as disclosed, for example in U.S. Pat. No. 3,337,429. During these steps, the porous ceramic tubule proves to be of particular advantage. Through this tubule 2, the forming solution for the dielectric oxide layer 6 can be relatively easily introduced into the sintering body. The dielectric oxide forming process is particularly easy if the mold with the sintering body is immersed in an electrolyte and the wire 5, through the wall of the mold 2, is connected as the anode. Following the oxide layer forming process, which, if necessary, is carried out several times, the forming solution is removed by decantation and rinsing. In the next step, the sintered body is manganized. The manganizing solution penetrates through the free surface of the sintered body and through the porous ceramic tubule into the sintered body. The manganizing process is also usually carried out several times. Prior to the last manganizing step, a wire 3, preferably of noble metal, is inserted as the cathode lead into the tubule. In the subsequent manganizing step, a highly conductive electrical joint is produced between the lead wire 3, inserted into the ceramic tubule, and the manganese oxide layer 7.

In the last step of the manufacturing process, the mold is sealed to keep out moisture. Fusing the open ends of the glass mold together is difficult without additional measures because the glass withstands the sintering temperatures of the aluminum powder and this temperature lies within a range in which the manganese oxide decomposes. Therefore, a well-known cast resin is poured into the open end of the mold. This seals the capacitor against the penetration of moisture from outside. If the glass mold can be sufficiently heated within a closely limited area having little thermal contact with the sintered mass, the open end of the glass mold can also be fused together.

What is claimed is:

1. A method of manufacturing a solid electrolytic capacitor, comprising pouring a metal powder into a mold of insulating material having an anode lead wire sealed in one end, inserting a porous hollow tubule of insulating material into the metal powder, and heating and sintering the powder together in the mold, introducing a solution for forming a dielectric oxide layer through said tubule into said sintered powder, forming said oxide layer, removing said solution, adding a manganizing solution through said tubule into said sintered powder, forming a manganese oxide layer, inserting a cathode lead through said tubule to join said manganese oxide layer, and sealing the open end of said mold.

* * * * *